Nov. 3, 1936.    G. W. SWIFT, JR    2,059,412
CUT-OFF MACHINE
Filed Feb. 1, 1936    3 Sheets-Sheet 1

Nov. 3, 1936.  G. W. SWIFT, JR  2,059,412
CUT-OFF MACHINE
Filed Feb. 1, 1936  3 Sheets-Sheet 3

INVENTOR
George W. Swift Jr
BY
Ward Crosby — Neal
ATTORNEYS

Patented Nov. 3, 1936

2,059,412

UNITED STATES PATENT OFFICE 2,059,412

CUT-OFF MACHINE

George W. Swift, Jr., Bordentown, N. J., assignor to George W. Swift, Jr. Inc., Bordentown, N. J., a corporation of New Jersey Application February 1, 1936, Serial No. 61,880

6 Claims. (Cl. 164—68)

The invention relates to a machine for cutting up advancing material into blanks or units of selected lengths. In the manufacture of corrugated paper board and fibre board, for example, such a cut-off machine is used at the delivery end of the machine which makes the paper board, and as the paper board is delivered from the making machine, the cut-off machine receives the traveling web and cuts it up into blanks of a length depending upon the use to which the material is to be put.

There are a number of requirements which a machine of the above character should satisfy. It is frequently required that the cut-off machine be adjustable to cut throughout a wide range of lengths. To avoid injury to the material or the machine, the cutter when engaging the material should always travel substantially in the same direction and at substantially the same speed as the material being cut throughout its entire range of adjustment for length of cut. Adjusting the machine to different lengths of cut either by altering the speed of feed of the material to be cut or the frequency of operation of the cutter will cause the above mentioned speed of travel of the cutter (hereinafter called "cutting speed") to be thrown out of equality with the speed of feed of the material, unless the machine be provided with special motion compensating features.

It is also very advantageous to provide a machine of the above character wherein the adjustments both for length of cut and "cutting speed" may be made while the machine is running, in order to avoid the necessity of stopping the machine or the feed of the material to be cut, when shifting from one length of cut to another. And machines which run continuously throughout the cutting cycle have been found to possess substantial advantages in certain respects over those of the intermittent clutch and brake type wherein the cutter stops when the clutch is released and the brake set, remains at rest for a period, and then starts up again when the clutch is re-engaged and the brake released, between successive cutting operations. Another common requirement is that the machine be exceedingly precise and reliable as to accuracy of cut for which purposes a machine having positively connected driving and driven parts has advantages over one involving the use of clutches or similar connections entailing slippage and lost motion.

The present invention aims primarily to provide a cut-off machine which will satisfy the above requirements and others, by the use of mechanism which involves markedly reduced complication and expense as compared to prior mechanisms which have been used for similar purposes. Further objects and advantages of the invention will be in part obvious and in part specifically referred to in the description hereinafter contained which when taken in conjunction with the accompanying drawings, discloses a machine constructed to operate in accordance with the invention; such disclosure, however, should be regarded as merely illustrative of the principles of the invention. In the drawings—

Figure 1:
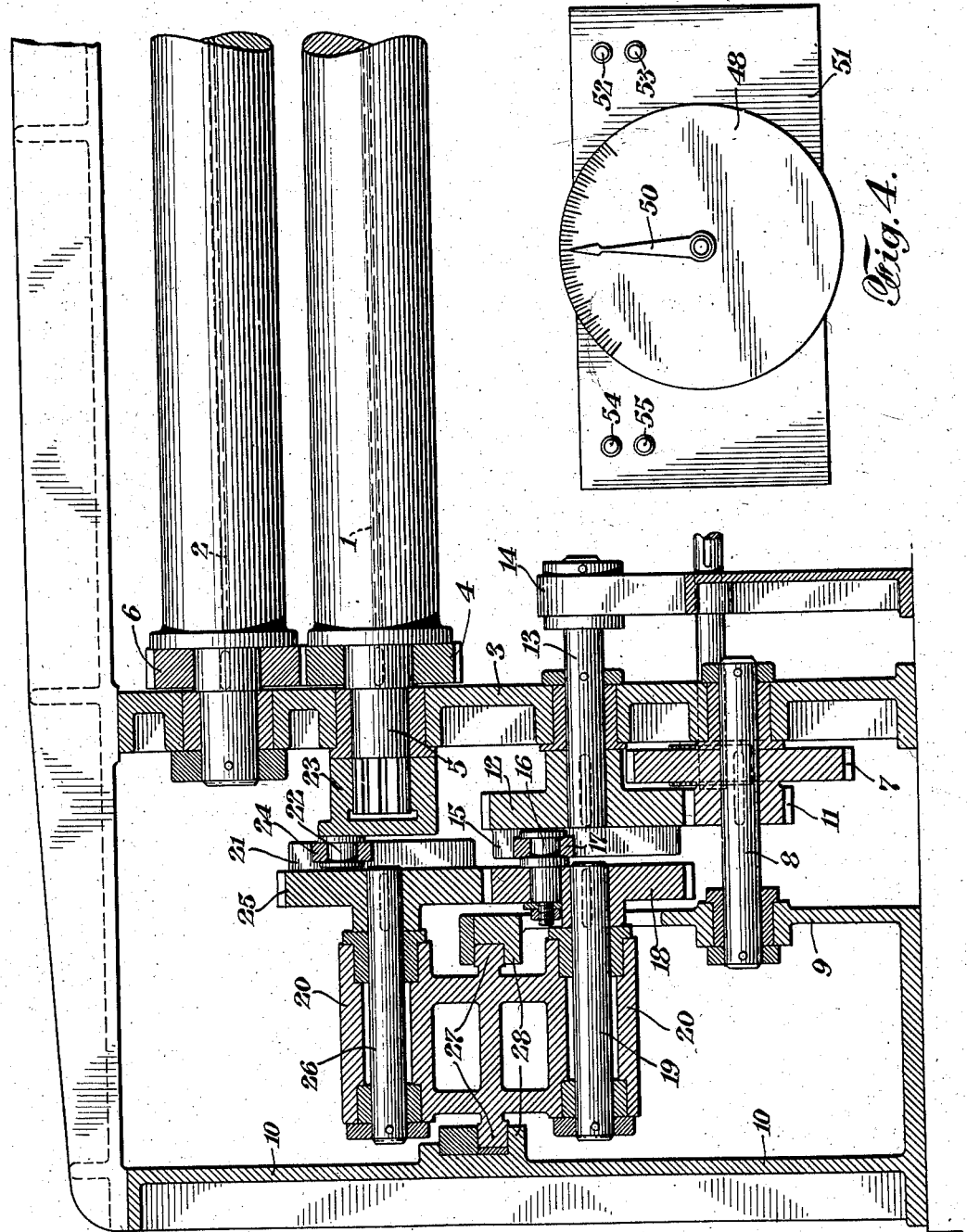
Fig. 1 is a sectional view of the machine taken substantially on broken lines 1—1 of Fig. 2.

In cut-offs of the continuously running type, various mechanisms, such as differential gearings and elliptical gears, have been used for the purpose of regulating the cutting speed to keep it equal to the speed of travel of the material being cut, under different adjustments for length of cut, and to enable the cutting speed to be regulated while the machine is running. These mechanisms are in general quite complicated and expensive. It has also been proposed to utilize the principle of the so-called differential crank for such purposes, i. e. if the cutter be driven by eccentric crank pin and slot elements, it is possible by altering either the eccentricity existing between these elements or their angular relationship to the cutter, to alter the cutting speed without affecting the frequency of cut, and either of these adjustments may be readily made while the machine is running. The differential crank is attractive from the standpoint of simplicity and economy, but has been subject to the vital objection that within the limits of practical design a maximum output speed greater than about two to one as compared to input speed cannot be realized, whereas a range much greater than this is desirable.

I have found that, by subdividing the operation into stages, so to speak, the differential crank principle may be utilized in a way which makes it possible to obtain a range in cutting speed sufficiently wide to satisfy the practical requirements in this regard, the mechanism being satisfactory in other respects and resulting in a machine which is substantially simpler in construction and more moderate in cost, and less space consuming than other machines satisfying practical requirements. For example, if two differential crank mechanisms in series be used in the train of gearing which drives the cutter, each having a maximum output speed within the cycle of two to one as compared to input speed, which is practical to obtain, the maximum cutting speed of the cutter will be four to one as compared to input speed. The ultimate speed ratio obtained equals the product of the ratios of the individual differential cranks employed, so that three of the above cranks, for example, would give a maximum cutting speed as compared to input speed, of eight to one. A like range of adjustment to secure output speed lower than input, is also obtainable. In other words, with two differential crank mechanisms as above described, an output speed about four times greater than input may be obtained by adjustment in one direction from neutral, and about four times less than input by adjustment in the other direction from neutral. In speaking hereinafter of a plurality of differential crank mechanisms connected in series, I have reference to such mechanisms so constructed and arranged that each individual mechanism or unit affords a range of adjustment of the order obtainable by a single differential crank, and wherein the series connected mechanisms afford a range of adjustment which is a multiple of the unit range according to the number of such mechanisms so connected in series. One advantage of the greater range thereby obtained, when the machine is applied to cutters of the rotary type, is that both cutters may be made of equal (and small) radius as shown in the drawings, in contrast with constructions as disclosed for example in prior Patent No. 1,951,536 issued in my name on March 20, 1934, wherein it is usually required to employ one cutter of large radius (double that of the other cutter) in order to afford the necessary cutting speeds.

The invention is illustrated as embodied in a machine having cooperating cutters 1 and 2 suitably supported by side frames 3. As shown the cutters are of simple rotary type, the gear 4 on the shaft 5 of the lower cutter 1 driving a gear 6 associated with the upper cutter, but various different cutter constructions capable of use are known in the art, and accordingly this part of the machine will not be described in great detail. Where wide widths of material are to be operated on, the line of cut usually travels transversely across the web as the cutter moves along therewith.

In Fig. 1 driving power for the cutter may be assumed as supplied to a gear 7 near the bottom of the figure, which is mounted upon a stub shaft 8, having suitable bearings in one of the side frames 3 and a web 9 extending up from an outboard side frame 10. A pinion 11 fixed to gear 7 in turn drives gear 12 located just above it and carried by a stub shaft 13 journaled in the side frame 3 and a standard 4.

In the illustrated form of the invention two differential crank mechanisms in series are employed, the first crank being constituted by the slot elements 15 carried by the gear 12, and the crank pin element 16 carrying an anti-friction roller 17 which engages in the slot between elements 15. The slot element of the differential crank thus serves as the power input, and the crank pin element its power output. As shown the crank pin element 16 is carried by a gear 18 mounted on a stub shaft 19 which is journaled upon a support 20.

The second differential crank mechanism is constituted by slot elements 21 between which works a crank pin element 22 mounted upon a cap 23 fixed to one end of the cutter shaft 5, the crank pin 22 being preferably provided with an anti-friction member 24. In the specific form of the invention illustrated, the slot elements 21 of the second differential crank are carried by a gear 25 driven by the gear 18, and mounted upon a stub shaft 26 which is also journaled in the support 20. Thus the slot elements 21 serve as the power input, and the crank element 22 as the power output of the second differential crank mechanism.

So long as the stub shafts 19 and 26 are both coaxial respectively with the shafts 13 and 5, uniform rotary motion will be transmitted through the differential crank mechanisms to the cutter, but if either or both of the shafts 19 and 26 be shifted to an eccentric position or the eccentricity altered, the cutting speed of the cutter will be varied proportionately, without affecting its frequency of cut.

In the particular form of the invention illustrated the two differential crank mechanisms may be conjointly shifted in position, since one element of each such crank mechanism is carried by the support 20. As shown, the support 20 is provided with slides 27 which engage in horizontal ways 28 respectively on the web 9 and an outboard frame 10, and thus by adjusting the position of support 20 the cutting speed of the cutter may be regulated. Where a radial form of adjustment is used, as illustrated, the cutters preferably operate at a phase of the cranks when the slots thereof are aligned with the line of adjustment. In Fig. 1, for example, the support 20 is adjusted in a horizontal plane and the cutters 1 and 2 preferably come into conjunction when the pins and slots are also horizontal. From a narrower aspect of the invention, I find it advantageous to mount the non-adjustable elements of the differential cranks side by side, and to mount the adjustable elements of the cranks side by side on a common adjustable support as shown in Fig. 1, so that one adjustment will serve all the cranks, although it should be understood that this is not essential to the invention in its broader aspects.

Figure 2:
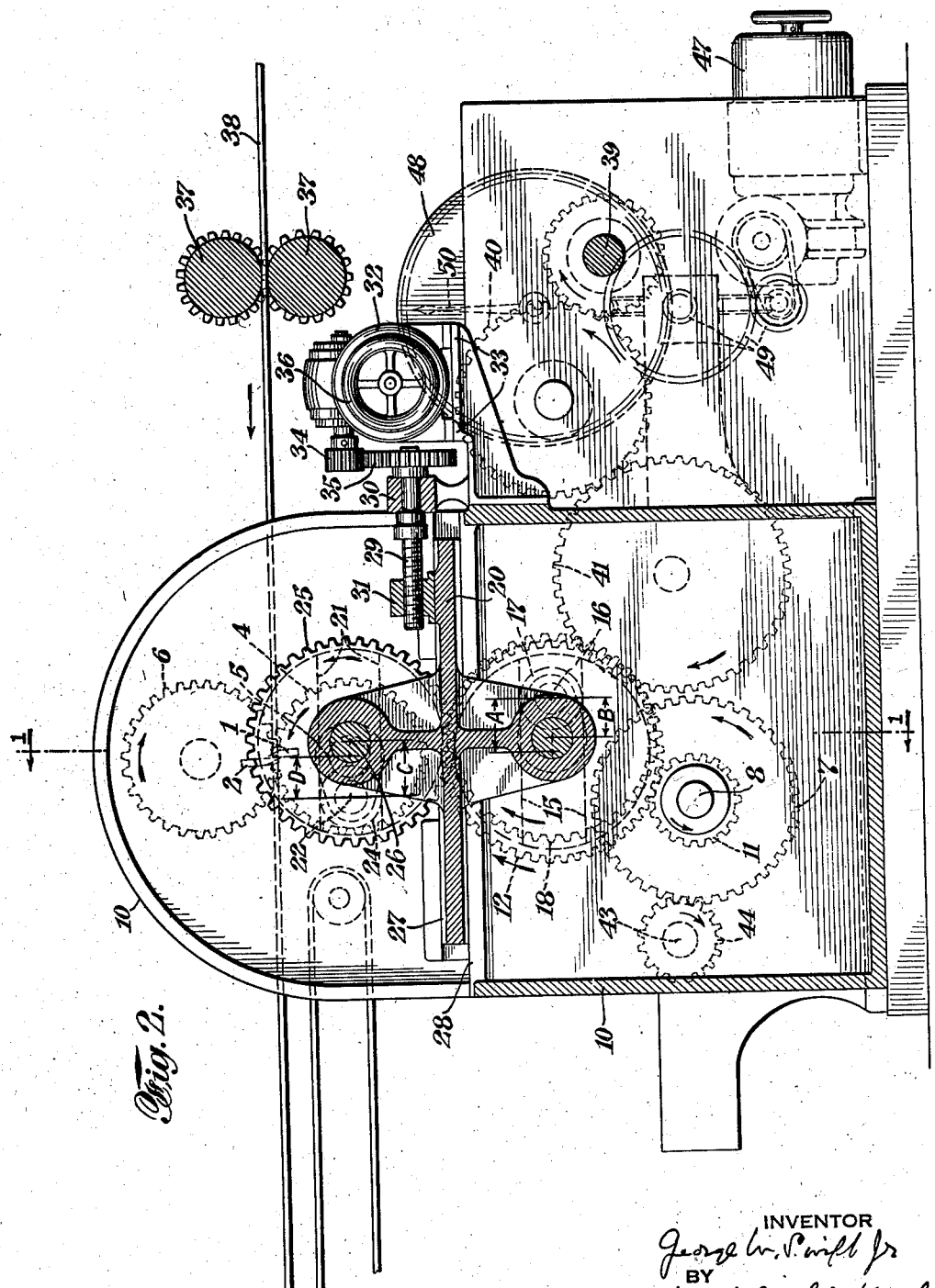
Fig. 2 is a longitudinal vertical section through the machine.

In the adjustments of the differential cranks which are indicated in Fig. 2, and at the phase shown in this figure, the input to output ratio of the first crank is indicated by the arrows marked A and B, and that of the second crank by the arrows marked C and D.

In machines where the length of cut is altered by regulating the frequency of the cutter, the mechanism preferably is so arranged that substantially uniform rotary motion is transmitted when operating at high frequency, the irregularity of the motion being increased as the cutters operate less frequently to cut longer blanks. This will relieve the shocks and strains on the machine to a substantial extent and it will be observed that for any given setting the mechanism produces only that degree of irregular motion which is necessary to produce or maintain the required cutting speed. In this respect the present invention has substantial advantages over prior machines involving the use of elliptical gears, wherein during each cycle the angular movement varies between maximum and minimum limits during each cycle, even though the machine may be operating in an adjustment for which only a minor irregularity in movement is required. In extreme adjustments the cutter may even come to rest, or substantially so, between cuts.

The position of the support 20 may be adjusted in any suitable manner. As shown in Fig. 2 for example, a rotary adjusting screw 29, journaled in the fixed bearing 30, may engage in a threaded post 31 carried by support 20, the screw 29 being rotated by means of a servo-motor 32 carried by the bracket 33 and connected to the screw through reduction gears 34 and 35. As shown a hand wheel 36 for supplementary adjustments is used in conjunction with the motor. Fig. 2 also shows diagrammatically a pair of feed rolls 37 which may be used to feed the web 38 to be cut, in between the cutters 1 and 2.

Figure 3:
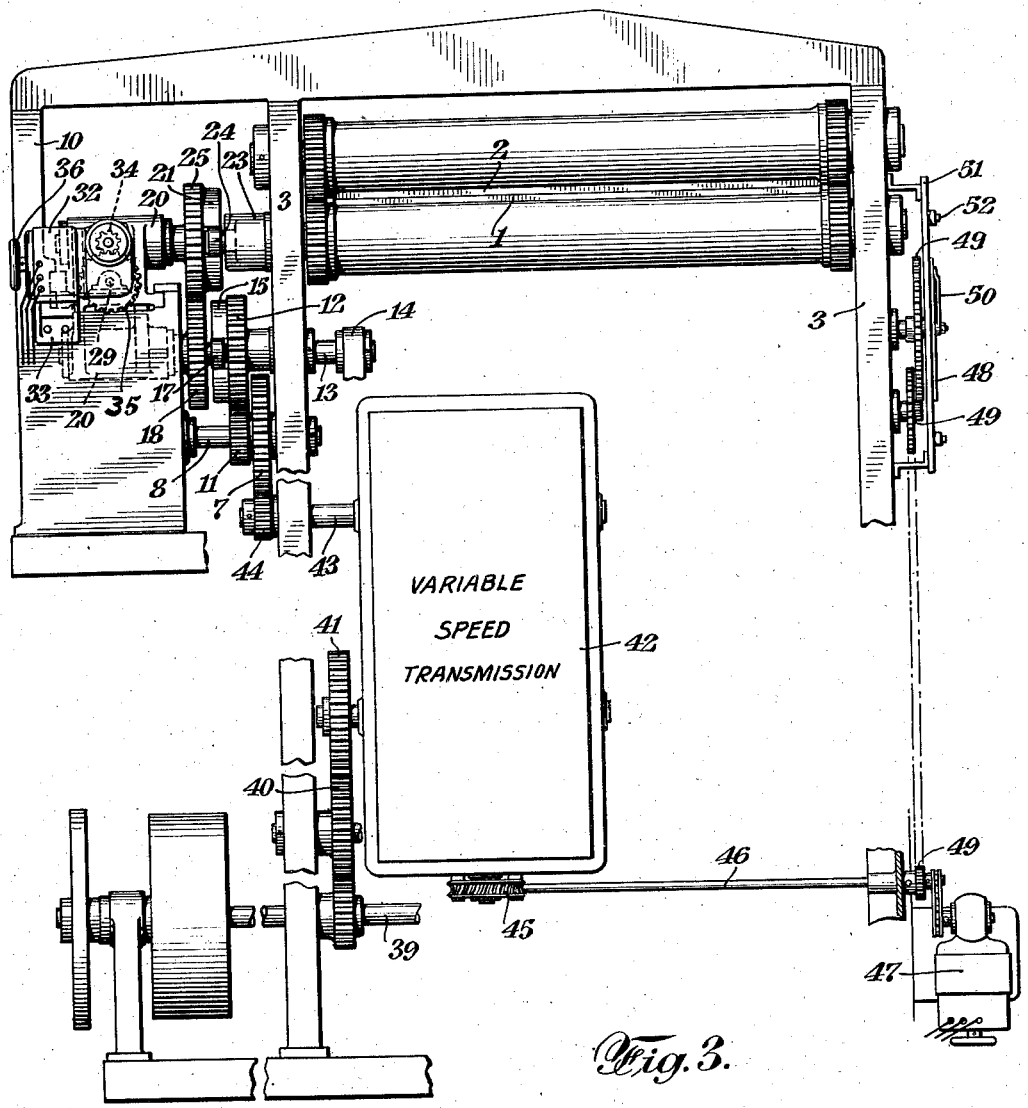
Fig. 3 is a schematic view wherein different operating parts of the machine are shown separately from various structural details which will usually be used in conjunction with them, in order to enable the main operating features of the machine to be more readily understood.

Fig. 3 shows schematically a mechanism of the character above described, used as a part of a machine wherein the length of cut is regulated by interposing a variable speed transmission between the source of power and the cutter, it being assumed that the material to be cut is fed in at a uniform and constant rate. In Fig. 3 the power may be understood as coming in from the shaft 39 near the bottom of the figure, and as conducted through gears 40 and 41, to the input of a variable speed transmission 42, any approved construction of which may be employed. The output shaft 43 of the variable speed transmission will deliver power through pinion 44 to the gear 7 previously described, at a rate of rotation depending upon the length of blank to be cut. In Fig. 3 a mechanism for adjusting the speed ratio of the variable speed transmission 42 is shown diagrammatically as including a worm gear 45 driven by a worm (not shown) on a shaft 46 which is in turn actuated by a servo-motor 47. Thus the motor 47 serves to regulate the length of cut and the motor 32 previously described serves to regulate the cutting speed. The cutting speed adjustment may be made either while the machine is running or at rest, and a variable speed transmission may be selected which is suitable for running adjustment or stationary adjustment, as desired.

In Fig. 3 I have shown diagrammatically a dial 48 connected to the shaft 46 by a chain 49 and suitable sprockets and gears which need not be described in detail, the dial being used in conjunction with a suitable pointer 50 to indicate the length of cut for which the machine is set. Fig. 4 also shows a panel board 51 on which the above indicator may be mounted in conjunction with push-buttons 52 and 53, which respectively actuate the length controlling motor 47 in forward and reverse directions, and push buttons 54 and 55 which respectively actuate the cutting speed controlling motor 32 in forward and reverse directions. Circuit connections suitable for the above purposes are well known and accordingly will not be described in detail. Thus by manipulation of the push buttons 52 to 55, the operator may adjust for length of cut and for cutting speed, either simultaneously or independently as desired, or supplementary corrections in either adjustment or both may be made whenever desired.

While the invention has been described in connection with a cut-off machine, analogous problems may be met with in the case of other tools traveling at the time of their operation in the direction of material to be operated upon which is being fed past them, and reference to cut-off mechanisms in the present specification and claims accordingly should be understood as embracing other tools or operating members for performing printing, cutting, creasing, impressing, or like operations upon progressively traveling material provided that problems analogous to those above described are presented, and within the scope permitted by the prior art.

Although the invention has been disclosed as embodying a specific form of mechanism it should be understood that many changes may be made therein without departing from the invention in its broader aspects, within the scope of the appended claims.

I claim:

1. A cut-off machine of the continuously driven type, including a cutter constructed to have at the time of cutting a component of motion in the direction of travel of the material being cut, a driving gearing for said cutter including a plurality of differential crank mechanisms connected in series, and means operable while the machine is running for adjusting the relative positions of the elements making up each of said differential crank mechanisms, to regulate the cutting speed of said cutter.

2. A cut-off machine of the continuously driven type, including a cutter constructed to have at the time of cutting a component of motion in the direction of travel of the material being cut, and a driving gearing for said cutter including a plurality of differential crank mechanisms connected in series, each of said crank mechanisms being constructed to afford adjustment between the relative positions of its crank pin and slot elements.

3. A cut-off machine of the continuously driven type, including a cutter constructed to have at the time of cutting a component of motion in the direction of travel of the material being cut, a driving gearing for said cutter including a plurality of differential crank mechanisms connected in series, the output element of the first such mechanism and the input element of the second such mechanism each having supporting means which is normally stationary but constructed to be adjustable in position while the machine is running to regulate the cutting speed of the cutter.

4. A cut-off machine of the continuously driven type including a cutter constructed to have at the time of cutting a component of motion in the direction of travel of the material being cut, a driving gearing for said cutter including a plurality of differential crank mechanisms connected in series, the output element of the first such mechanism and the input element of the second such mechanism being mounted upon a common normally stationary support, and means operable while the machine is running for adjusting the position of said common support to regulate the cutting speed of the cutter.

5. A cut-off machine of the continuously driven type including a cutter constructed to have at the time of cutting a component of motion in the direction of travel of the material being cut, a driving gearing for said cutter including a plurality of differential crank mechanisms connected in series, the input element of the first such mechanism and the output element of the second such mechanism being supported in substantially side by side relation, the output element of the first such mechanism and the input element of the second such mechanism being also disposed substantially side by side and connected by gearing, and a common adjustable support for said last mentioned elements and gearing.

6. A cut-off machine of the continuously driven type, including a cutter constructed to have at the time of cutting a component of motion in the direction of travel of the material being cut, a driving gearing for said cutter including a plurality of differential crank mechanisms connected in series, and means operable while the machine is running for conjointly adjusting the elements of each of said differential crank mechanisms to regulate the cutting speed of said cutter.

GEORGE W. SWIFT, Jr.